Oct. 6, 1925.
T. C. HOLLNAGEL
1,556,335
BEET TOPPER
Filed Aug. 29, 1921
2 Sheets-Sheet 2
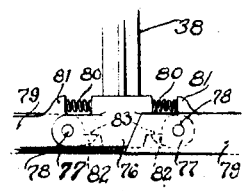
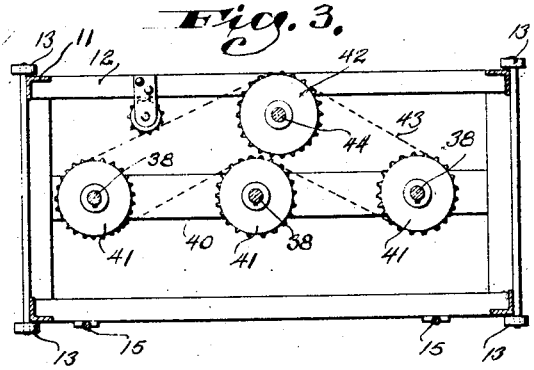
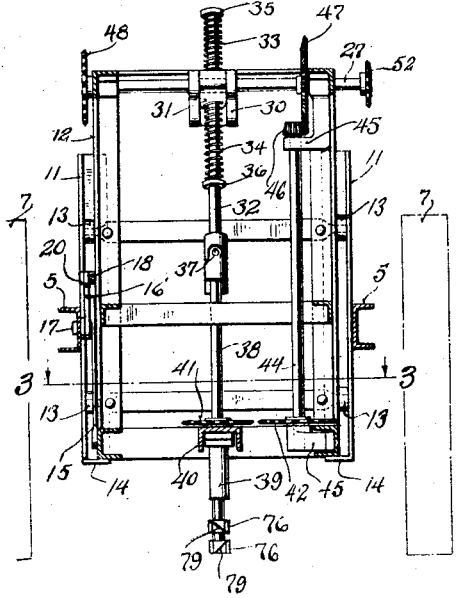
INVENTOR.
Theodore C. Hollnagel
BY
Ira M. Jones.
ATTORNEY.

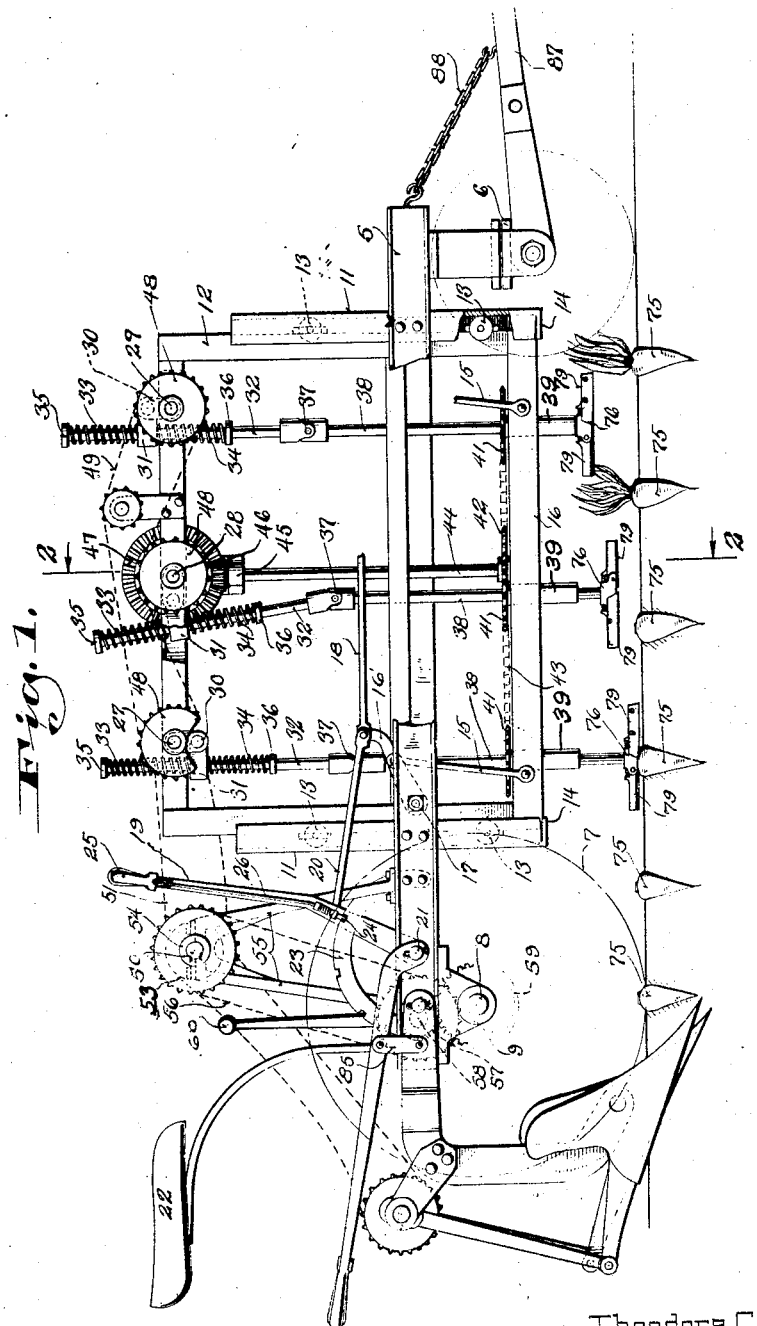

Patented Oct. 6, 1925.

1,556,335

UNITED STATES PATENT OFFICE.

THEODORE C. HOLLNAGEL, OF MILWAUKEE, WISCONSIN.

BEET TOPPER.

Application filed August 29, 1921. Serial No. 496,240.

*To all whom it may concern:*

Be it known that I, THEODORE C. HOLLNAGEL, a citizen of the United States, and resident of Milwaukee, in the county of Milwaukee and State of Wisconsin, have invented new and useful Improvements in Beet Toppers, of which the following is a description, reference being had to the accompanying drawings, which are a part of this specification.

This invention relates to certain new and useful improvements in agricultural implements and refers more particularly to what may be termed a topper for beets and the like.

It is one of the objects of this invention to provide a beet or the like topping machine so designed and constructed that the cutting means advance downwardly toward the beet or the like and are yieldably held thereagainst while the top is being removed in order to perform a clean job and at the same time eliminate the possibility of injury to the beet or the like were the cutting member to advance theretoward from the side.

It is another object of this invention to provide a machine of the class described which is capable of operation where the ground is uneven and broken on its surface and which will insure the proper topping of all the beets.

A further object of this invention is to provide a beet, or the like, topper in which the beets or the like are topped while still in the ground.

A still further object of this invention is to provide a machine of the class described in which all the parts thereof are readily adjustable to accommodate the same for various working conditions and one which may be constructed at a moderate price and which will form its functions in a highly satisfactory manner.

This invention has for a more specific object to provide an improved form of topping member in which the blades thereof are resiliently held in position whereby the same will give upon striking an object in its path and thus prevent injury thereto.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a machine embodying my invention, parts thereof being broken away and in section to more clearly illustrate details of construction;

Figure 2 is a view taken transversely through Figure 1 on the plane of line 2—2;

Figure 3 is a detailed horizontal sectional view taken on the line 3—3 of Figure 2, and Figure 4 is an enlarged fragmentary view illustrating one of my improved topping members.

Referring now more particularly to the accompanying drawings in which like numerals designate like parts throughout the several views:

The numeral 5 designate a frame, supported at its forward end by a steering truck 6 and at its rear end by power take off wheels 7, mounted on an axle 8 journaled in bearings 9 secured to the adjacent frame sides. The wheels 7 are connected to the axle 8 by suitable ratchet means (not shown) enclosed within housings 10 whereby the relative difference in speeds of the wheels in making a turn is accommodated for.

Secured to each side frame bar are two complementary guides 11 in the form of vertical angle irons to provide a guide-way for a vertically adjustable frame 12. The frame 12 journally mounts guide rollers 13 on the corner posts thereof which track in the guides 11 as best shown in Figures 1 and 2. The downward movement of the frame 12 is limited by stops 14 which close the lower ends of the guides 11 and said frame is moved to adjusted position by links 15 having their lower ends pivotally secured to the lower end of one side bar 16 of frame 12 and their upper ends medially pivoted to levers 16' (but one being shown) pivotally connected as at 17 to the adjacent supporting frame side bar. The outer free ends of the levers 16' are pivotally connected by a rod 18 and the rear lever is connected with an operating lever 19 by a rod 20. The lever 19 is journaled on a shaft 21 carried by the frame 5 at a point adjacent a driver's seat 22 and a segment 23 is secured to the side of the supporting frame adjacent lever 19 and has notches in the periphery thereof with which a spring pawl or catch 24 engages for releasably retaining the lever 19 in adjusted position. The usual member 25 for releasing pawl 24 is positioned adjacent the hand grip of lever 19 and is connected with the pawl by a rod 26.

Transversely journaled in the frame 12 at the top thereof are shafts 27, 28 and 29 which have crank throws 30 medially formed therein and to which are secured block members 31 for slidably receiving rods 32. Each rod 32 is yieldably secured within its block 31 by springs 33 and 34 which are confined between the top face of said block and a cap 35 on the upper end of the rod and the lower face of said block and a washer 36 on said rod, respectively.

Each rod 32 is connected by a knuckle joint 37, to a vertical shaft 38 slidably and rotatably journaled in a bearing member 39 carried by a longitudinally extending central beam 40 of the frame 12, each shaft 38 having a slidable spline connection with a sprocket wheel 41, the sprocket wheels being connected with a drive sprocket wheel 42 by a sprocket chain 43.

The sprocket wheel 42 is made fast to a shaft 44 journaled in bearings 45 and having a beveled pinion gear 46 on the upper end thereof in mesh with a drive bevel gear 47 carried by shaft 28. Shafts 27, 28 and 29 have sprocket wheels 48 secured thereto which are connected by a sprocket chain 49, shaft 27 being connected with a counter shaft 50 by a chain 51 trained around a sprocket wheel 52 mounted on shaft 27 and a sprocket wheel 53 on shaft 50.

The counter shaft 50 is journaled in a bearing 54 formed on the upper end of a standard 55 carried by one side bar of the frame 5 and is connected by a sprocket and chain connection 56 with a drive shaft 57 journaled adjacent axle 8. Shaft 57 is drivingly connected with axle 8 by a slidable but non-rotatable gear pinion 58 which meshes with a drive gear 59 carried by the axle, gear 58 being connected with an operating lever 60 whereby the same may be moved into and out of engagement with gear 59 to control the drive of the machine.

Fixed to the lower end of each shaft 38 is a head 76 having two pairs of spaced lugs 77 extending in opposite directions and between which are pivotally secured, as at 78, cutting members 79. The cutting members 79 are at all times yieldably urged to a horizontal position by springs 80 confined between head 76 and upstanding projections 81 carried by the cutting members, the movement of the cutting members under action of springs 80 being limited by stops 82 which abut shoulders 83 formed between the lugs 77, see Figure 4. With this construction it will be readily apparent that in the event the cutting members 79 strike some obstacle in their path breakage will be prevented by the ability of the same to move upwardly against the action of the springs 80.

The machine is drawn over the ground by power means or by horses and the draw bar 87 thereof is connected with the upper part of a frame forward end by a flexible member 88 whereby any tendency to lift the forward wheels from the ground is overcome. Were the topping or cutting members 79 to remain on the same horizontal plane and thus approach the beets or the like to sever the tops therefrom, any portion of the beet protruding beyond the plane at which the cutting members operate would be bruised or severed. Therefore, my invention approaches the beets directly over the top and if the same project upwardly any distance, the cutting member thereadjacent compresses its spring 34 and thus insures the severing of the top only.

Furthermore by having the topping members alternately moved vertically by means of their crank connection with the shafts 27, 28 and 29 the machine is enabled to operate efficiently on uneven ground, as in high places the springs 34 will be compressed and at low places the springs 33 will urge the cutting members to this lower limit of movement which is set to be approximately level with the mean low ground.

What I claim as my invention is:

1. In a machine of the class described, means for topping beets or the like comprising a cutter member, means for continuously alternately engaging and disengaging said member with the tops of beets or the like, and means for actuating said cutter member.

2. In a machine of the class described, means for topping beets or the like comprising a vertical reciprocally mounted shaft, a cutter member carried by the lower end of said shaft, means for continuously reciprocating said shaft during the operation of the machine to engage the cutter member with the beet or the like to be topped, and means for actuating the cutter member.

3. In a machine of the class described, means for topping beets or the like comprising a vertical reciprocally mounted shaft, a cutter member carried by the lower end of said shaft, means for continuously reciprocating said shaft to engage the cutter member with the beet or the like to be topped, yieldable means for holding the cutter member against the beet or the like top, and means for actuating the cutter member.

4. In a machine of the class described, means for removing the tops of beets or the like and comprising a reciprocally mounted shaft, a cutter mounted on the lower end thereof, a crank arm, a yieldable connection between said crank arm and said shaft for reciprocating the same, and means for rotating said shaft.

5. In a machine of the class described, means for removing the tops of beets or the like and comprising a reciprocally mounted shaft, a cutter mounted on the lower end thereof, a crank arm, a yieldable connection between said crank arm and said shaft for reciprocating the same, and means for adjusting the position occupied by said cutter when said shaft is at its lower-most limit of movement.

6. In a machine of the class described, means for removing the tops of beets or the like and comprising a portable supporting structure, a frame vertically adjustably mounted therein, a plurality of shafts journaled in said frame, cutting members mounted on the lower ends of said shafts, means for operating said cutting members, and means for vertically reciprocating said cutting members as the machine is moved over the ground to alternately engage the same with the tops of the beets or the like to be topped.

7. In a machine of the class described, a portable supporting structure, a plurality of beet or the like topping members, and means for continuously reciprocating said members to engagement with the tops of beets or the like over which the machine is passed.

8. In a machine of the class described, beet or the like topping means comprising a hub member, cutting members pivotally carried thereby, and means retaining said members in a substantially horizontal position.

9. In a machine of the class described, beet or the like topping means comprising a hub member, cutting members pivotally carried thereby, and means for yieldably retaining said members in a substantially horizontal position.

In testimony whereof I affix my signature.

THEODORE C. HOLLNAGEL.